(12) United States Patent
Farmer

(10) Patent No.: US 6,885,921 B1
(45) Date of Patent: Apr. 26, 2005

(54) METHOD AND APPARATUS FOR MANAGING AIRCRAFT MAINTENANCE RECORDS

(76) Inventor: Grace H. Farmer, 428 Sycamore La., Euless, TX (US) 76039

( * ) Notice: Subject to any disclaimer, the term of this patent is extended or adjusted under 35 U.S.C. 154(b) by 68 days.

(21) Appl. No.: 10/142,200

(22) Filed: May 9, 2002

(51) Int. Cl.[7] .......................... G06F 11/30; G06F 15/00
(52) U.S. Cl. ................... 701/29; 340/945; 702/184; 714/25
(58) Field of Search ................. 701/29, 30, 33, 701/34, 31, 45, 35, 101; 340/825.54, 825.52, 426, 438, 945, 963, 43.1, 500, 104.3; 702/184, 185, 188; 714/25; 382/146, 141, 152; 342/29, 30, 32, 36, 40; 348/86; 345/50, 60, 26.8

(56) References Cited

U.S. PATENT DOCUMENTS

| | | | | |
|---|---|---|---|---|
| 5,931,877 A | * | 8/1999 | Smith et al. ................... | 701/29 |
| 6,292,806 B1 | * | 9/2001 | Sandifer ...................... | 707/104 |
| 6,295,488 B1 | * | 9/2001 | Longere ....................... | 701/29 |
| 6,418,361 B1 | * | 7/2002 | Sinex .......................... | 701/29 |
| 6,529,620 B1 | * | 3/2003 | Thompson .................. | 382/141 |
| 2001/0032109 A1 | * | 10/2001 | Gonyea et al. ................. | 705/8 |
| 2001/0032110 A1 | * | 10/2001 | Sinex .......................... | 705/8 |
| 2002/0143421 A1 | * | 10/2002 | Wetzer ....................... | 700/100 |
| 2003/0003872 A1 | * | 1/2003 | Brinkley et al. .............. | 455/66 |
| 2003/0037238 A1 | * | 2/2003 | Warner et al. .............. | 713/168 |
| 2003/0149548 A1 | * | 8/2003 | Mosses et al. .............. | 702/184 |
| 2003/0195675 A1 | * | 10/2003 | Felke et al. ................... | 701/29 |
| 2004/0078123 A1 | * | 4/2004 | Igloi et al. ..................... | 701/29 |

* cited by examiner

Primary Examiner—Thomas G. Black
Assistant Examiner—Tuan C To
(74) Attorney, Agent, or Firm—Garlick Harrison & Markison, LLP; James A. Harrison

(57) ABSTRACT

An apparatus and method for an aircraft maintenance server includes a system in which an electronic package is created for delivery to the maintenance personnel. The electronic package includes all of the specific maintenance process tasks that must be performed to satisfy local, international governmental regulations as well as operator and aircraft manufacturer defined procedures. Additionally, the electronic package includes a list of parts that will be required for the specified tasks and, optionally, a flow chart illustrating the overall process.

6 Claims, 11 Drawing Sheets

| WORK CARD # 404 | | PAGE # 408 | |
|---|---|---|---|
| AIRCRAFT TYPE: 412 | CLIENT: 416 | REG # 420 | SERIAL # 424 |

WORK TITLE:
428

| CONSTRAINTS: 432 | PROCEDURES: 436 |
|---|---|
| ROUTINE/ NON-ROUTINE 440 | MAJOR / MINOR WORK 444 |

WORK:
450

| DESCRIPTION 452 | WORKER ID 454 | TIME 456 | DATE 458 |
|---|---|---|---|
| | | | |
| | | | |
| | | | |
| | | | |
| | | | |
| | | | |
| | | | |

REMARKS:
460

| WORK COMPLETED BY: 464<br>NAME: 464a  AUTH #: 464c<br>DATE: 464b  STAMP: 464d | QUALITY CHECK: 468<br>NAME: 468a  AUTH #: 468c<br>DATE: 468b  STAMP: 468d |
|---|---|

FIGURE 4

METHOD AND APPARATUS FOR MANAGING AIRCRAFT MAINTENANCE RECORDS

BACKGROUND

1. Field of the Invention

The present invention relates generally to maintenance systems and more particularly, to maintenance systems for managing and administering aircraft maintenance.

2. Description of Related Art

Aviation maintenance requires a massive effort to keep maintenance records and schedule maintenance. To this day, paper systems are used.

Adequate maintenance records must be kept for the aviation authority under which the aircraft is registered. For example, an aircraft registered by the United States of America must keep records according to the rules of the Federal Aviation Administration ("FAA"). Furthermore, an aircraft registered for commercial use with the FAA must comply to Federal Air Regulations ("FAR") for commercial aircraft, whilst those aircraft registered for private use must comply to the regulations for private aircraft. An aircraft maintenance facility must understand and comply with the maintenance and record-keeping rules according to the registered nationality of the aircraft and the use for which it is registered. Add to this the different maintenance schedules set by aircraft operators and there exists an extremely complex set of rules governing the maintenance of each aircraft. For this reason, many maintenance facilities specialize in few carriers and aircraft types.

Additionally, for a maintenance facility at an international airport, where aircraft from many different international operators may require maintenance, either scheduled or unscheduled, that fall under additional maintenance requirements. For example, in addition to the maintenance schedules and requirements required by aircraft operators, the maintenance requirements of the governmental jurisdiction from which the plane originates must be followed. Additionally, even the aircraft manufacturer has a unique set of maintenance procedures and requirements. Accordingly, even knowing what must be done to comply with all requirements and regulations is a matter that only experts may resolve. Additionally, because an aircraft flies across the world, a maintenance shop can never know with certainty what the maintenance history of a plane is unless that plane carries its maintenance records with it. Thus, in today's day and age of computer sophistication, aircraft maintenance is still monitored on paper-based systems.

More specifically, the maintenance tasks are usually recorded using paper-based work cards. These work cards are controlled by a supervisor and the progress of the task is tracked thereon the card. On completion of the task, the work is checked by qualified personnel, and if satisfactory, approved with a signature on the card.

The amount of labor for the task may be taken from the card and billed to the customer accordingly. However, a problem exists that in less busy periods some workers may record their hours worked by picking a card from a rack and embellishing it with additional labor time. For example, an entire day might be charged to one or two charge codes because those charge codes represent the only tasks addressed that day. If those tasks typically take only several hours, then two much time is charged simply because things are slow that day. Using such a paper system is open to dishonest behavior since it is difficult to verify actual labor for a particular task.

Additionally, the handling of the paper-based work records can be inconvenient. Each aircraft requires a repository to store work records for the life of the aircraft. With many aircraft having an operational life exceeding well over thirty years, this is an arduous task and requires an increasingly copious amount of physical space as the aircraft ages. Additionally, it requires personnel to maintain and archive the records appropriately. All of these factors add to the cost of operating and maintaining an aircraft.

Should work card get lost, destroyed or damaged in the maintenance facility, then it may be replaced by making another. While this is inconvenient, it is necessary to maintain the paper records for the aircraft.

Accordingly, there is a need for a maintenance system operating under the required regulations, whilst managing the maintenance tasks for a given aircraft. It would be further desirable to store records of the maintenance tasks in the maintenance system. It would also be desirable for the maintenance system to manage and assist in other aspects of the maintenance operations such as, but not limited to, personnel, supply management, payroll and auditing.

SUMMARY OF THE INVENTION

An apparatus and method for an aircraft maintenance server includes a system in which an electronic package is created for delivery to the maintenance personnel. The electronic package includes all of the specific maintenance process tasks that must be performed to satisfy local, international governmental regulations as well as operator and aircraft manufacturer defined procedures. Additionally, the electronic package includes a list of parts that will be required for the specified tasks and, optionally, a flow chart illustrating the overall process. More specifically, the maintenance server includes at least one database that specifies the maintenance procedures as well as maintenance tasks that can be performed for one or more aircraft. Whenever an aircraft maintenance manager logs in and defines the maintenance function that is to be performed, the electronic package is created that includes all of the foregoing information and is stored upon a portable media that the maintenance personnel may take back to a user terminal either for display or printing. As a part of the specified procedures, the maintenance personnel either is given or prints cut a specific list of tasks that are checked off by the maintenance personnel as they are completed. The list of completed tasks are then given to the maintenance supervisor for entry and approval. Once a task or maintenance function is completed, and approved by the maintenance manager, then the data is stored and secured so that it cannot be inadvertently overwritten or improperly accessed. Additionally, all corresponding time charges are stored. Additionally, the time charge numbers for the aforementioned tasks are closed so that no more time may be charged or entered against those tasks.

BRIEF DESCRIPTION OF THE DRAWINGS

FIG. 4 is an exemplary work card;

DETAILED DESCRIPTION OF THE DRAWINGS

Figure 1:
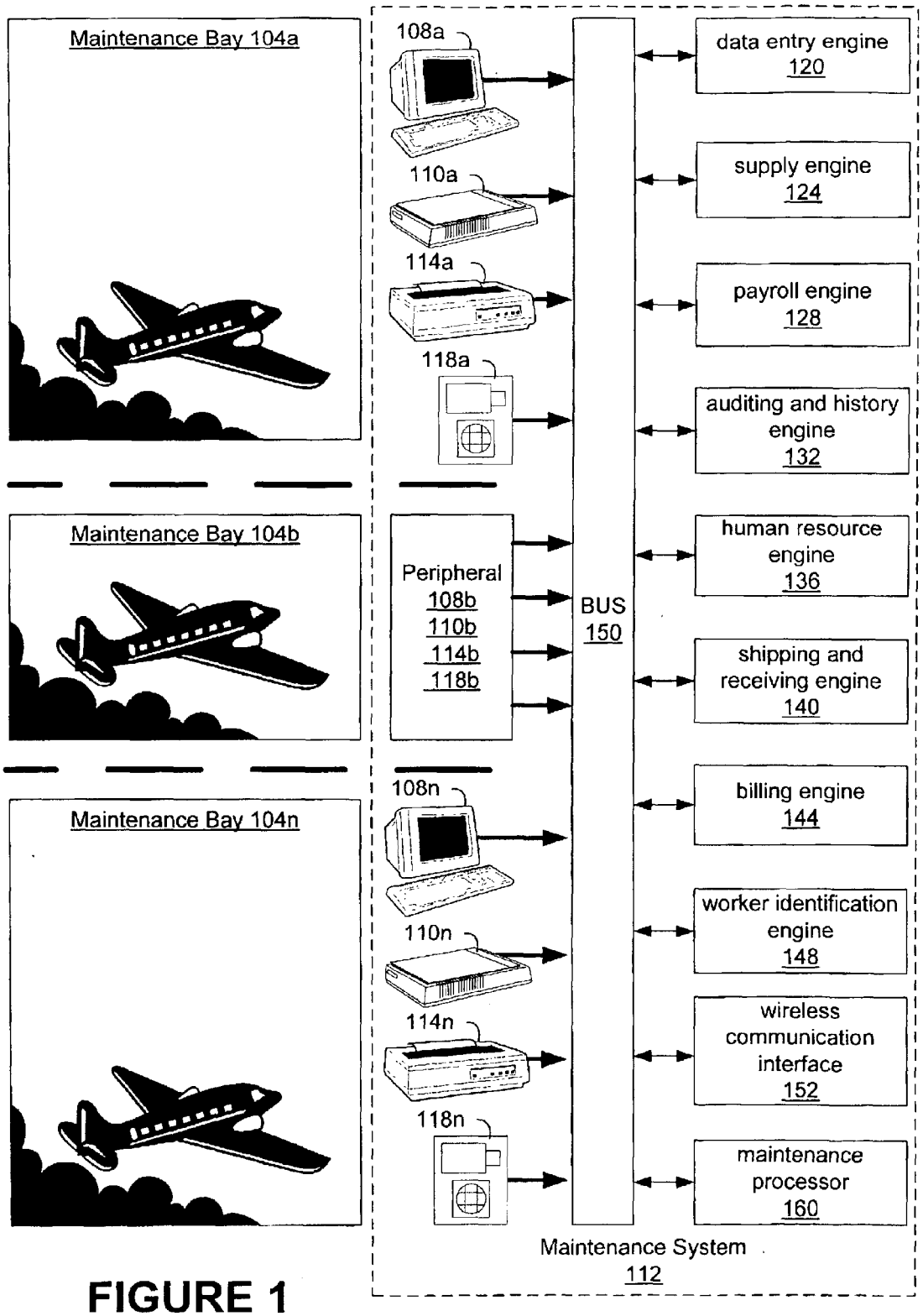
FIG. 1 is a functional block diagram that illustrates an exemplary maintenance server for a maintenance facility for managing aviation maintenance.

FIG. 1 is a functional block diagram that illustrates an exemplary maintenance server for a maintenance facility for managing aviation maintenance. Maintenance facility 100 has maintenance bays 104a through 104n, where n is a value that indicates the upper limit of maintenance bays that can be physically accommodated. In most instances, a maintenance bay is provisioned to accommodate an aircraft or an aircraft part such as an engine, for maintenance thereon.

Maintenance bays 104a through 104n are provisioned with system terminals 108a through 108n respectively, for access to maintenance system 112. Terminals 108a through 108n may be computer-based systems having interfaces to maintenance system 112.

Maintenance system 112 has various operational and management modules and subcomponents. As used herein, these modules and subcomponents are referred to as engines. Examples and the functionality of such engines is referred to in further detail in the description of FIGS. 1 through 15. Each engine is communicatively coupled to maintenance system 112 via a respective interface. As used herein, "Communicatively coupled" refers to the coupling of a plurality of functional modules and/or subcomponents such that signals may be passed from one functional module to another. An example of the coupling of the engines may be seen in FIG. 1, in which data entry engine 120, supply engine 124, payroll engine 128, auditing and history engine 132, human resource engine 136, shipping and receiving engine 140, billing engine 144 and worker identification engine 148 are communicatively coupled to a bus 150 on which signals may be carried.

Signals may also be carried using wireless technology to enable maintenance terminals 108a through 108n to be portable. Such a wireless implementation has a wireless communication interface 152 communicatively coupled to bus 150 enabling data transfer between functional engines and maintenance terminals.

Other peripherals may be communicatively coupled to bus 150 in a similar manner to the maintenance terminals. Such peripherals include, but are not limited to, scanners 110a through 110n, printers 114a through 114n and diagnostics devices 118a through 118n. Scanners 110a through 110n, printers 114a through 114n and diagnostics devices 118a though 118n may be permanently or temporarily associated with maintenance projects in bays 104a through 104n respectively. For example, scanners 110a to 110n may be used to read in data from a work card in conjunction with data entry engine 120. Diagnostics devices 118a through 118n may be used to measure or connect to aircraft components and relay data to maintenance system 112. For aviation systems having interfaces or data transfer of diagnostic information, data may be provided to maintenance system 112 via a diagnostic device 118a through 118n.

In operation, a worker might log into terminal 108a, for example, to enter her ID and a task or project ID. The human resource engine then communicates with the maintenance server to determine what tasks are to be completed next for the given work ard the tasks for which she is certified or allowed to perform. Accordingly, an electronic package is created delineating the task and corresponding process steps that must be performed. The electronic package is then displayed on the worker terminal or is written to a disk to enable the worker to take the task and process steps back to the work area. Alternatively, the electronic package is transmitted by a wireline or wireless link.

Thereafter, as diagnostic data is entered in to the system by a diagnostic tool 118a and as the worker indicates that the task is complete, the supply engine updates a list of replacement parts, the payroll engine makes payroll entries, the billing engine makes billing entries, the auditing and history engine closes any applicable charge numbers that relate to the task, and the list of completed task are updated.

The shipping and receiving ("S&R") engine 140 facilitates the shipping and receiving function of the maintenance facility. In this function, the shipping and receiving engine 140 tracks incoming and outgoing parts and interacts with the logistics module 520 (see FIG. 5). The S&R engine 140 may also interact with the delivery systems of courier companies, for example, Federal Express™ and United Parcel Service™, to check the progress of a shipment and then provide the estimated time of arrival to the logistics module 520.

Billing is an important aspect of the maintenance operations, not only from a commercial perspective but also because a 'bill' is one of the few documents that customers read thoroughly. Thus, billing errors have a direct impact on customer perception of the maintenance facility. The primary functions of this vital activity are to request payment from all customers and to perform any subsequent follow-up actions. The billing cycle includes data collections, charge raising, pricing, invoicing, receipting, credit management and fraud monitoring.

The billing engine 140 monitors the progress of each maintenance task (as specified on a work card) and bills for labor, parts and other resources once the task is completed. Some customers may have direct electronic billing to their financial systems, while others may require a paper invoice. Dependent on the customer preference, billing may be provided by either method (or both). The billing engine may set credit terms and monitor the payment of each bill. Information from the billing engine interacts with financial and accounting systems so that-accounts may be automatically maintained.

Worker identification engine 148, as mentioned above, identifies a worker ID for a task that is to be performed. It is essential that maintenance is performed by appropriately qualified personnel. To this end, only appropriately qualified personnel should have access to predetermined work cards and be authorized to sign-off on the work done. In addition, many maintenance tasks have to be cross-checked and signed-off by a supervisor.

In the present embodiment, worker identification engine 148 includes and maintains a worker identification database which may contain identifying information such as but not limited to, pass badge scanning, handwriting characteristics (e.g. signature), biometrics identification (e.g. retinal scans, fingerprint scans, voice recognition, etc.), image recognition, and so on.

Once the person is positively identified, the authorization and qualifications for performing the task may be checked with a worker profile of the human resource engine 136. In addition, a signal may be sent to the payroll engine 128 detailing the work and time that the person spent on the task, updating the worker profile.

Figure 2:
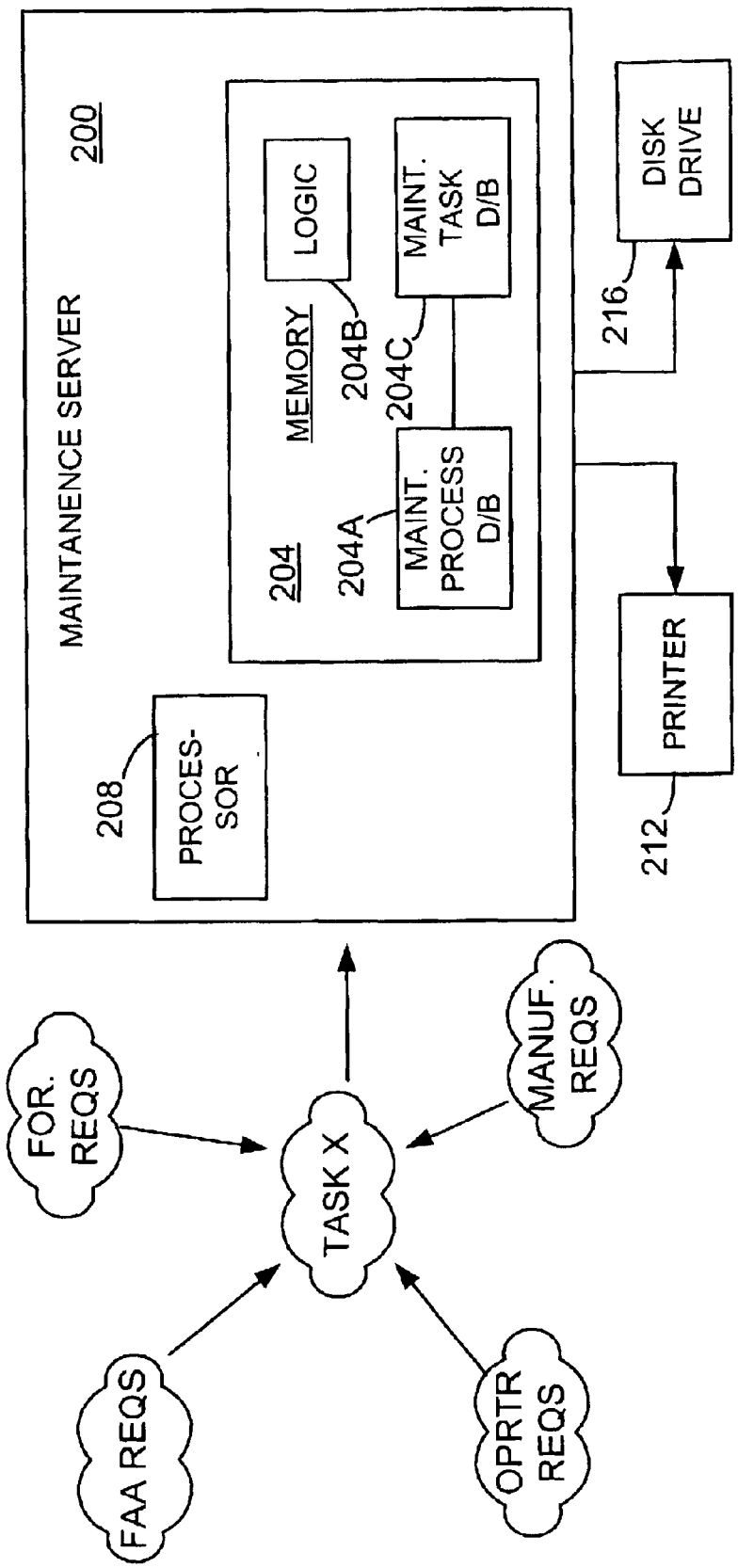
FIG. 2 is a functional block diagram illustrating a maintenance server according to one embodiment of the present invention.

FIG. 2 is a functional block diagram illustrating a maintenance server according to one embodiment of the present invention. As may be seen, maintenance server 200 is coupled to receive a large number of tasks and a plurality of requirements for each task according to foreign jurisdiction requirements, flight aviation administration (FAA) requirements, operator requirements, and aircraft manufacturer requirements. Thus, maintenance server 200 includes a maintenance task database that maintains a list of steps that must be performed for every task to satisfy each of the aforementioned maintenance requirement guidelines. Additionally, server 200 includes a database that defines all of the maintenance tasks that must be performed for a given aircraft to satisfy the requirements of each of the jurisdictions and companies whose requirements must be satisfied for an aircraft to be properly maintained. As may be seen, server 200, therefore, includes a memory 204 that includes the maintenance task database and the maintenance process database as well as a processor 208. As is understood by those skilled in the art, memory 204 actually includes computer instructions that define the data that form the maintenance task and maintenance process databases. The computer instructions are then received and executed by an internal processor thereby achieving the logical operation defined by the computer instructions.

Also, it is understood by those skilled in the art, the two databases may be formed separately or collectively as one database. In the embodiment where they are formed as one database, different reports may be defined and generated according to the desired type of report. Memory 204 further includes a set of computer instructions that define the operational logic of the server 200. Processing unit 208 executes the computer instructions within memory 204 to access the specific types of data and to generate the desired types of reports. While processing unit 208 may provide output through any one of a plurality of different mediums and ports, the example of FIG. 2 illustrates that server 200 is coupled to produce reports on paper by way of printer 212 and electronically to a disk drive 216 that stores the data in the corresponding disk drive format. For example, if disk drive 216 is a compact disk having read/write capability, then server 200 produces data thereto for storage on a compact disk. A more detailed operation of server 200 is found in the description of the figures that follow.

Figure 3:
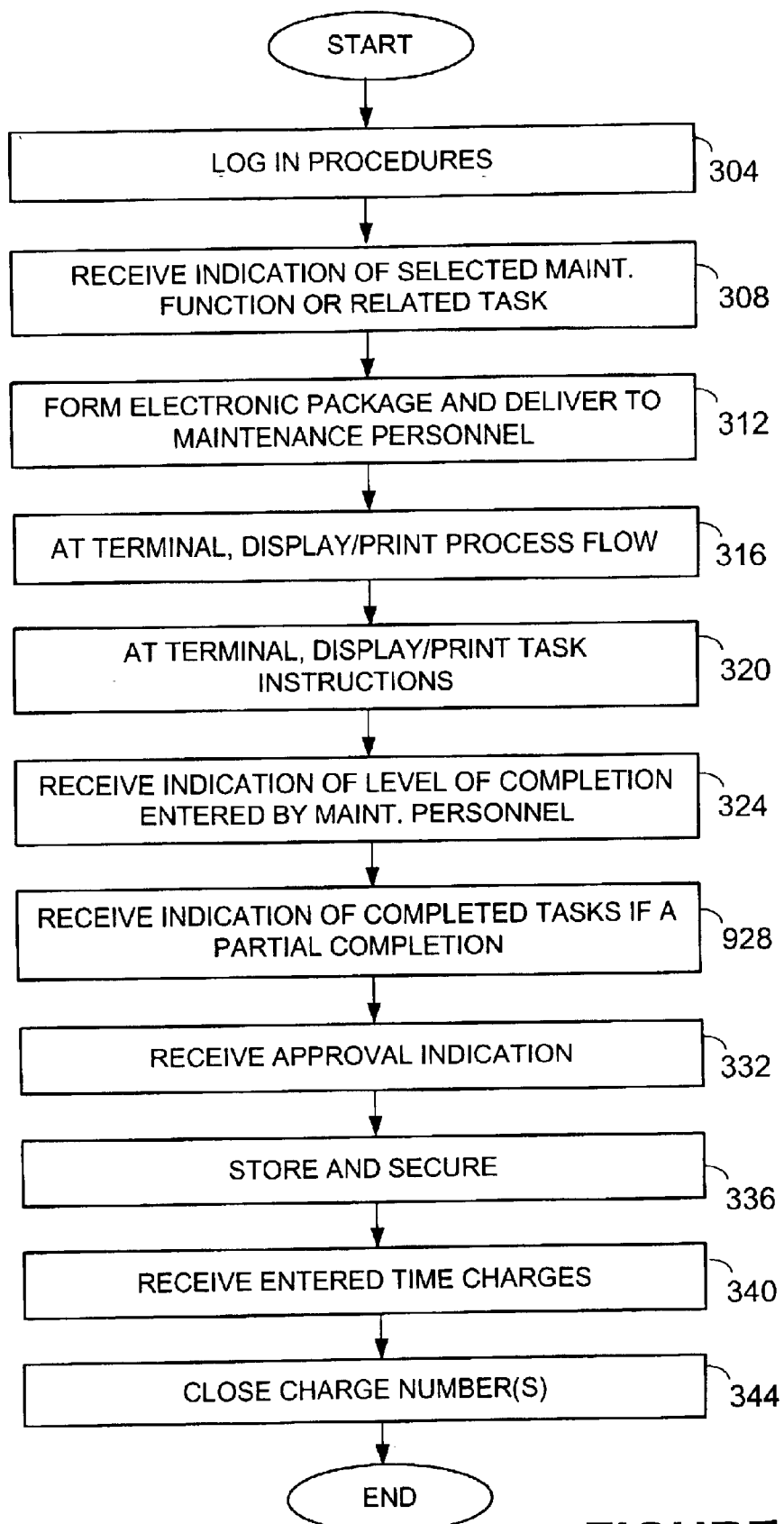
FIG. 3 is a flow chart illustrating a method of monitoring aircraft maintenance according to the present invention.

FIG. 3 is a flow chart illustrating a method of monitoring aircraft maintenance according to the present invention. Referring now to FIG. 3, the inventive method is initiated by executing specified login procedures (step 304). The login procedures include the sub-steps of verifying that a supervisor's ID and password or other means of identification have been properly entered as well as the proper identification of an employee that is to receive electronic maintenance instructions and information. One reason for this is that various maintenance personnel are only qualified to perform certain types of maintenance tasks. That qualification can either be in terms of a license or in terms of company training. Thus, a maintenance server receives an ID of the employee. The server also receives an indication of the project. The server determines the next uncompleted task in the project task list that the employee is qualified or authorized to perform. To do so, the server examines an employee profile stored in memory and verifies what tasks may be performed by the employee. The server also determines whether employer approval is required prior to generating an electronic package for the employee.

In an alternate embodiment of the invention, the login procedures includes only verifying that a supervisor has properly logged into the system. In the present invention, the login procedures are required by a maintenance supervisor for every set of maintenance instructions that are to be generated or every time maintenance status information is to be stored in order to verity authenticity and to minimize the chances of improper or accidental entries to the database being made.

Thereafter accepting an employee's ID and allowing her to login, the inventive procedures include, for a given aircraft, receiving an indication of the maintenance function and/or related tasks that are to be performed. Typically, a maintenance function and its related tasks are identified by name or code. Accordingly, upon prompting by the maintenance server, a maintenance supervisor enters an indication of the maintenance function that has to be performed. Thus, the server receives the maintenance function (step 308). After receiving the maintenance function, the server forms an electronic package that is to be given to the maintenance personnel (step 312).

The maintenance package includes, in one embodiment of the invention, a list of the specific maintenance steps that are to be performed. In an alternate embodiment of the invention, the electronic package also includes flow charts that define the overall process for the maintenance task being performed. In the present embodiment of the invention, the electronic package is transmitted by the server to a disk drive where it may be stored on a specified media.

For example, the information may be stored on a compact disk drive. The disk drive may be intricately attached to the server or may be attached externally and may be coupled to the server by way of a port. Thus, once the electronic package is stored on the specified media, it is given to the personnel. The inventive method, at the user terminal of the maintenance personnel, includes displaying or printing the maintenance process flow (step 316). Additionally, the method includes displaying or printing the specific task instructions (step 320). In one embodiment of the invention, the detail task instructions are displayed or printed automatically for the given task procedure. In another embodiment of the invention, higher level of process steps are defined wherein more detailed process steps are displayed only upon request by the maintenance personnel.

Resuming the method at the maintenance server, a supervisor, who has logged in following similar login procedures to those specified in step 304, reviews a worksheet submitted by the maintenance personnel and enters an indication of the level of completion. Thus, the maintenance server receives an entered indication of the level of completion (step 324). Thereafter, if an entire maintenance procedure has not been completed, as defined in the electronic package given to the maintenance personnel, then the supervisor enters the completed tasks it the lists of tasks were only partially completed. Thus, the next optional step is receiving the tasks entered by the supervisor that were completed by the maintenance personnel (step 328). Back in step 324, if the supervisor had entered that the employee partially completed the task, then the maintenance server prompts the supervisor to specify which of the task steps were completed. Thereafter, the invention includes receiving an indication from the employee supervisor of his or her approval for the task steps that were completed as indicated (step 332). Typically, a supervisor verifies the work that is performed and approves its quality.

If the supervisor does not approve the work performed, then the maintenance server does not record that the task is completed. Once a manager approval is received in step 332, however, the maintenance server stores and secures the maintenance records (step 336). Additionally, for those tasks that are completed and approved by a supervisor, the maintenance server receives the time charges that are entered by the supervisor (step 340). Accordingly, the charge numbers for the specified tasks are closed so that no more time may be charged thereto (step 344).

FIG. 4 is an exemplary work card. As may be seen, work card 400 comprises several information fields, which are described in further detail below. As used herein, the terms "data" and "information" may be used interchangeably.

Work card 400 has a unique work card identifier 404 used for identifying purposes. Work card 400 may have one or more pages, with the page number indicated by page field 408. The type of aircraft is represented in aircraft type field 412. The client may be shown as a name or an identifier associated with the client (e.g. AA=American Airlines™, UA=United Airlines™, etc.) in client field 416. The registration identifier for the aircraft is entered in registration field 420. A unique serial number, which remains with the aircraft over the operational life is entered in serial number field 424. The work card may have a title associated with the work specified on the work card; and the work title field 428 contains this information. Information entered into the constraints field 432 may include special factors to take into account when performing the maintenance. Predetermined maintenance procedures as specified by the aviation manufacturer, aviation authority, operator or maintenance facility may be referenced in procedures field 436.

Maintenance can be routine or non-routine. Routine maintenance is typically performed in accordance with a maintenance schedule, whereas non-routine maintenance is oftentimes performed to remedy symptoms of a problem. The distinction between these two types of maintenance is indicated in the routine/non-routine field 440. The work card may be for major or minor maintenance tasks. The classification of tasks would either be in a maintenance manual under classification guidelines, or it may be left to the discretion of the maintenance personnel. Major and minor work is indicated in major/minor work field 444.

The work tasks are detailed in work field 450. Work field 450 has a table in which a description of the task is recorded in description field 452. The worker identification of the maintenance person performing the maintenance is recorded in worker ID field 454. The time taken for the work task is recorded in time field 456; and the date is recorded in date field 458.

Additional remarks may be documented in remarks field 460. When the work is completed, it is authorized and dated by an authorized person. As may be seen in work completed field 464, provided are fields for the worker name 464a, the date 464b, an authorization number or number associated with the worker 464c and an authorization stamp 464d. The authorization endorsement may be any form of verifiable mark such as a signature, rubber stamp, emboss, hologram, digital signature or sticker to indicate that the work has been signed off by the authorized person. The common feature of the authorization endorsement is that it enables verification of an endorsement of work. A quality check field 468 may also be used according to the major/minor nature of the maintenance performed. Quality check field 468 has a worker name 464a, date 464b, authorization number or number associated with the worker 464c and authorization stamp 464d fields for the personnel certifying the quality of the performed maintenance.

For machine identification, work card 400 may use a machine-readable article such as a bar code, machine-readable text, magnetic strip, hologram, or an equivalent for machine-readable recognition, for the purposes of identifying work cards. In this embodiment, a bar code 472 is shown. Locators 480a–480d provide a positional reference for the coordination of fields in scanning and/or printing the work cards. This allows for easier document handling and for easier location of the information fields on the document.

The scanner 110a uses a locating method to identify the work card type and to accurately locate the textual content in the data fields of the work card 400. A work card 400 may be scanned with a scanner 110 and the image of the work card may be transmitted to at least one of the engines shown in FIG. 1 such as, for example, the supply engine 124, the payroll engine 128 or the billing engine 144.

The aforementioned data fields of work card 400 in the work card image are located using internal data location circuitry as known by those skilled in the art. Locators 480a–480d of FIG. 4 are used as positional references to locate information fields on the work card 400. The text is translated by the scanner 110a to a data compatible format such as ASCII. The data fields may be separated using comma or tab delimitation, or any equivalent thereof that separates the data fields. This data may then be stored in a record associated with the work card identifier 404 of FIG. 4. Scanner 110a has a scan switch that is used to initiate the scanning of a work card. Scanner 110a translates typed text and printed handwriting. This translation may be performed using optical character recognition ("OCR") techniques embodied in scanner 110a's internal circuitry. OCR apparatus and methods are known by persons of ordinary skill in the art of optical character recognition.

The work card record 400 is now available to the maintenance system 112 (see FIG. 1) and the data can be manipulated in accordance with a work card managing rule set 1104 stored in the data entry engine 120. The work card managing rule set determines the access privileges given to each system user to manipulate the data in a work card. For example, a maintenance worker may have limited privileges to change records, whereas a supervisor may have higher level privileges to change and manipulate data in the records.

Once data is in the system, a hard copy of the work card is reconstructed in the predetermined work card format of the aircraft company. Optionally, this data may also be transmitted via a communication interface 152 (see FIG. 1) to an electronic work card repository (not shown) in the aircraft. The communication interface is, in one embodiment, a wireless interface. Thus, the aircraft may carry an electronic copy of its work cards wherever it travels. These records may be synchronized with a maintenance server 160 (see FIG. 1) on which work cards are stored.

Alternatively, or in addition, so that data cannot be tampered with after the completion of work, work cards may be stored in an image format such as Portable Data Format (PDF), as specified by Adobe Systems, Inc., in a JPEG, bitmap, or in any other known image storage format. For authentication purposes, an image may have an electronic security "watermark" added to it. "Watermarking" is an emerging technique used for verifying the authorship of graphical images by adding an electronic watermark unique to the creator of the graphic. The watermark may be revealed by performing a predetermined rendering function on the image. Other authentication means include the use of digital signatures and/or cryptography. In the present inventive system, data entry engine 120 includes the logic for generating the water marks that are placed on the image drawings stored therewithin.

In a second embodiment, once the image is scanned in, it is stored in one of the aforementioned image formats. Additions may be made to the image in blank spaces reserved for such additions (e.g. sign-off spaces, remarks, time taken, worker ID, dazes, etc.). The record may then be saved either in the same file, in an appended file, or a new file under a different name, but referenced by the previous record to maintain record history and continuation. History of access to each file and file creation, modification and deletion may be recorded in auditing and history module 700 of FIG. 7; as can any authentication information such as digital signatures and watermarks. This aids in the auditing of work card records and the associated work performed.

Figure 5:
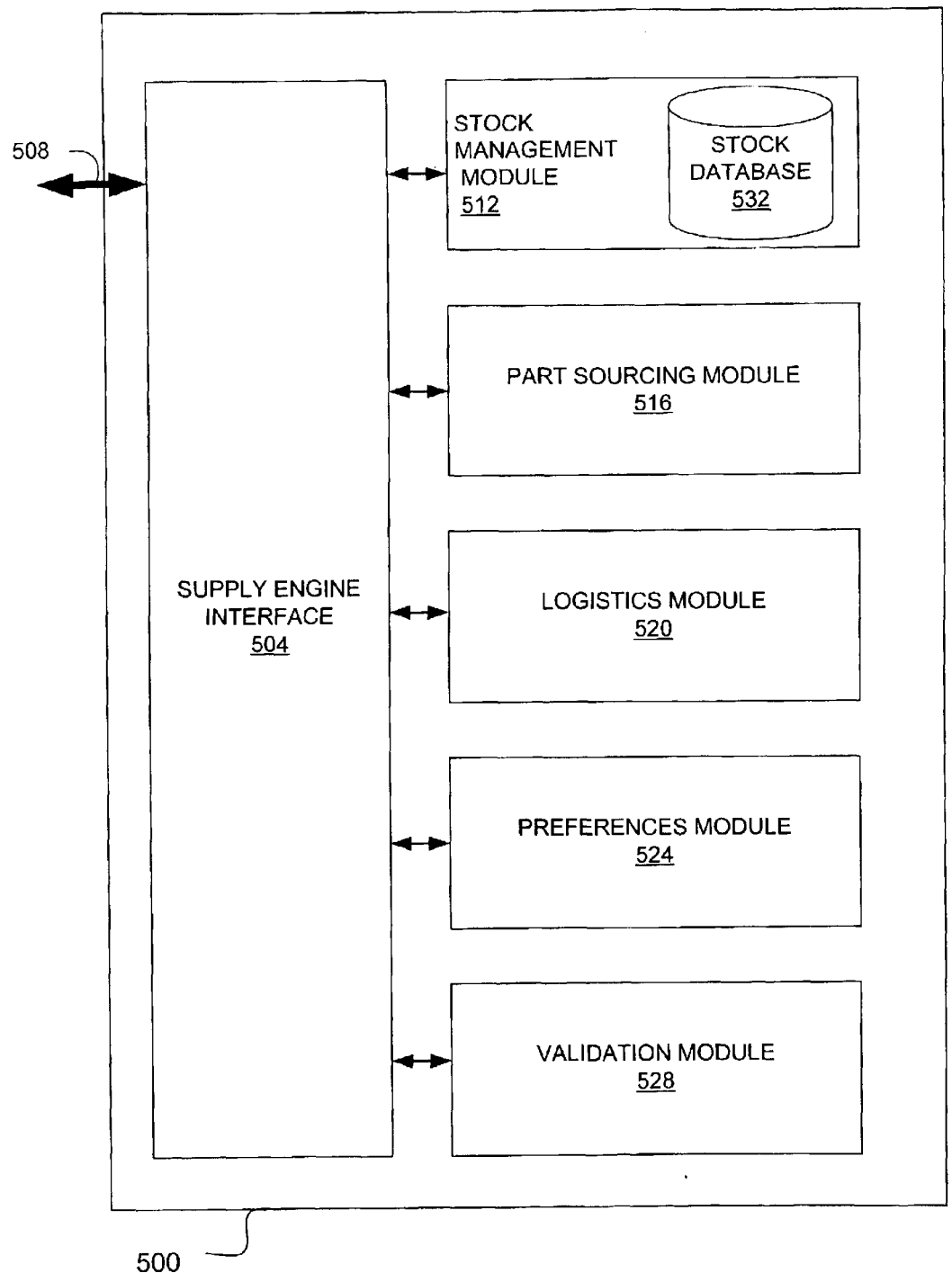
FIG. 5 is functional block diagram of supply engine.

FIG. 5 is functional block diagram of supply engine. Supply engine 500 directs the purchasing and supply function in support of the maintenance operations. As specified on a work card, routine scheduled maintenance may require the provision of suitable parts. When such routine maintenance is scheduled, supply engine is responsible for the managing the supply of predetermined parts in good time. Thus, anticipating the need for these predetermined parts and arranging the timely supply of them brings the advantages of keeping a minimal quantity of parts in storage, therefore reducing overhead. Furthermore, anticipation of parts needed and their timely supply helps ensure minimal down-time for the aircraft whilst it is grounded, awaiting delivery of required parts.

Stock management module 512 may query a stock database 532 to check if a part is already in stock. If a part is in stock then stock management module 512 may place a request for the part to be reserved for a particular job/day or arrange for it to be timely delivered to a location in the maintenance facility for collection of the part by maintenance personnel.

Aircraft parts are sourced from suppliers in diverse geographic locations. As such, delivery times of ordered parts varies significantly according to the location and the delivery method (e.g. air, surface, etc.). A logistics module 520 takes these logistical factors into account to determine an estimated sourcing time for parts. Well in advance, part sourcing module 516 may communicate with suppliers directly to check part availability, cost or may make a query to an online aircraft parts portal on which aircraft parts are advertised. Such a portal may contain information on the part including part number, date of manufacture, serial number, cost, availability, history (e.g. new/used/used in aircraft . . . ) and any other information as required by aviation regulatory bodies. Part sourcing module 516 may generate a list of required parts for a given aircraft, period of time (e.g. a particular day, week, etc.) and this list may then be used by supply personnel to source parts manually.

To reduce the risk of purchasing black-market and/or counterfeit aircraft parts, a validation module 528 may check a part's pedigree by cross-checking this data from the part supplier with an authorized manufacturer or an online resource that has a database for validating part pedigrees.

A varying degree of autonomy for ordering the required parts may be programmed into supply engine and these preferences for autonomy are stored in the preferences module 524. Preferences module 524 may also list preferred suppliers for providing predetermined parts. Preferences for the ordering of parts may be programmed into preferences module 524 to require human intervention for the authorization of an order; or for an order exceeding a set threshold. Budgetary constraints may also be programmed into preferences module 524 with preferences for sourcing new or used parts.

Figure 6:
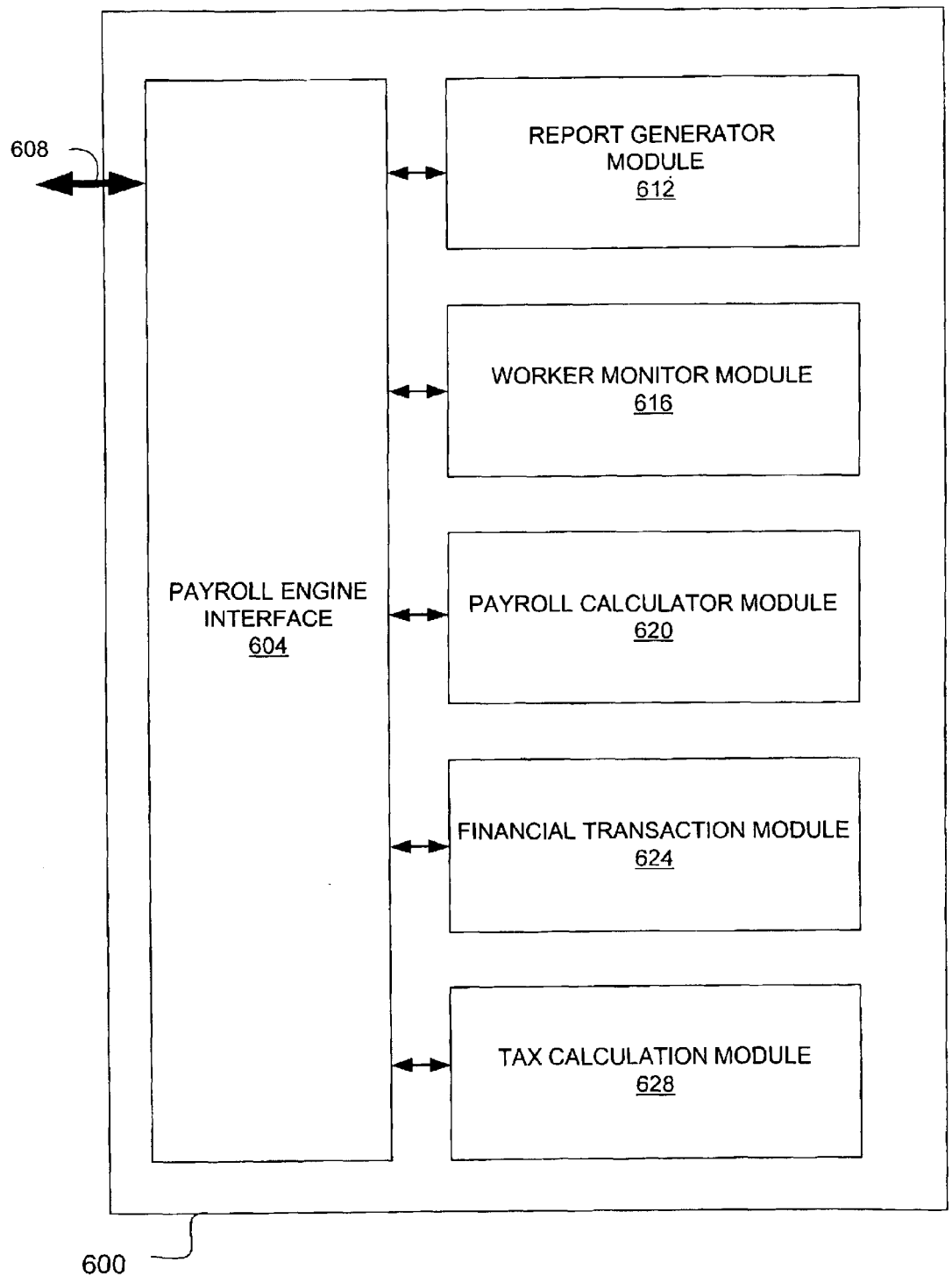
FIG. 6 is a functional block diagram of payroll engine.

FIG. 6 is a functional block diagram of payroll engine. Payroll engine 600 may access maintenance server 160 (see FIG. 1) and extract data relating to work done by an individual, by a team of workers, work done over a period of time, and so or. Work records in the maintenance server 160 may be queried and a report with predetermined content may be generated automatically by report generator module 612. Worker monitor module 616 monitor work hours in particular tasks to reduce account billing for idle time. More specifically, whenever a work card is scanned in by a worker, module 416 activates a time clock function to monitor the amount of time that elapses until a data entry is made indicating the task is completed. The data entry may be made either by a subsequent scanning of the work card with updated information by actual date entry by way of a keyboard or other conventional data entry method. Thus, once a task is complete, the worker monitor module no longer will accept time entry for the completed task.

Payroll calculator module 620 automatically calculates remuneration for workers and may make financial calculations relating to the worker before effecting payment. The financial calculations may be made in collaboration with tax calculator module 628, which contains tax rules and regulations according to the taxing jurisdiction. Financial transaction module 624 may effect a payment such as an Electronic Financial Transfer ("EFT") to the worker's bank account. Financial transaction module 624 may alternatively arrange the automated printing of a paycheck for the worker.

Report generator module 612 may provide data in a predetermined format compatible with payroll systems. Payroll data may be automatically transmitted to a remote site either over a secure, encrypted link, over the internet, or a dedicated connection. This arrangement may enable an aircraft maintenance facility to outsource the payroll function to an external service provider; thus allowing the maintenance facility to concentrate human resources on the core aspects of the business.

Data may be transmitted at predetermined times/dates or payroll engine may be polled by an external payroll system requesting data with routine or specific queries. Records may also be sent to human resources and finance functions.

Closely related to the payroll function is a human resource database. This stores data relating to workers registered with the system and is described in FIG. 8.

Figure 7:
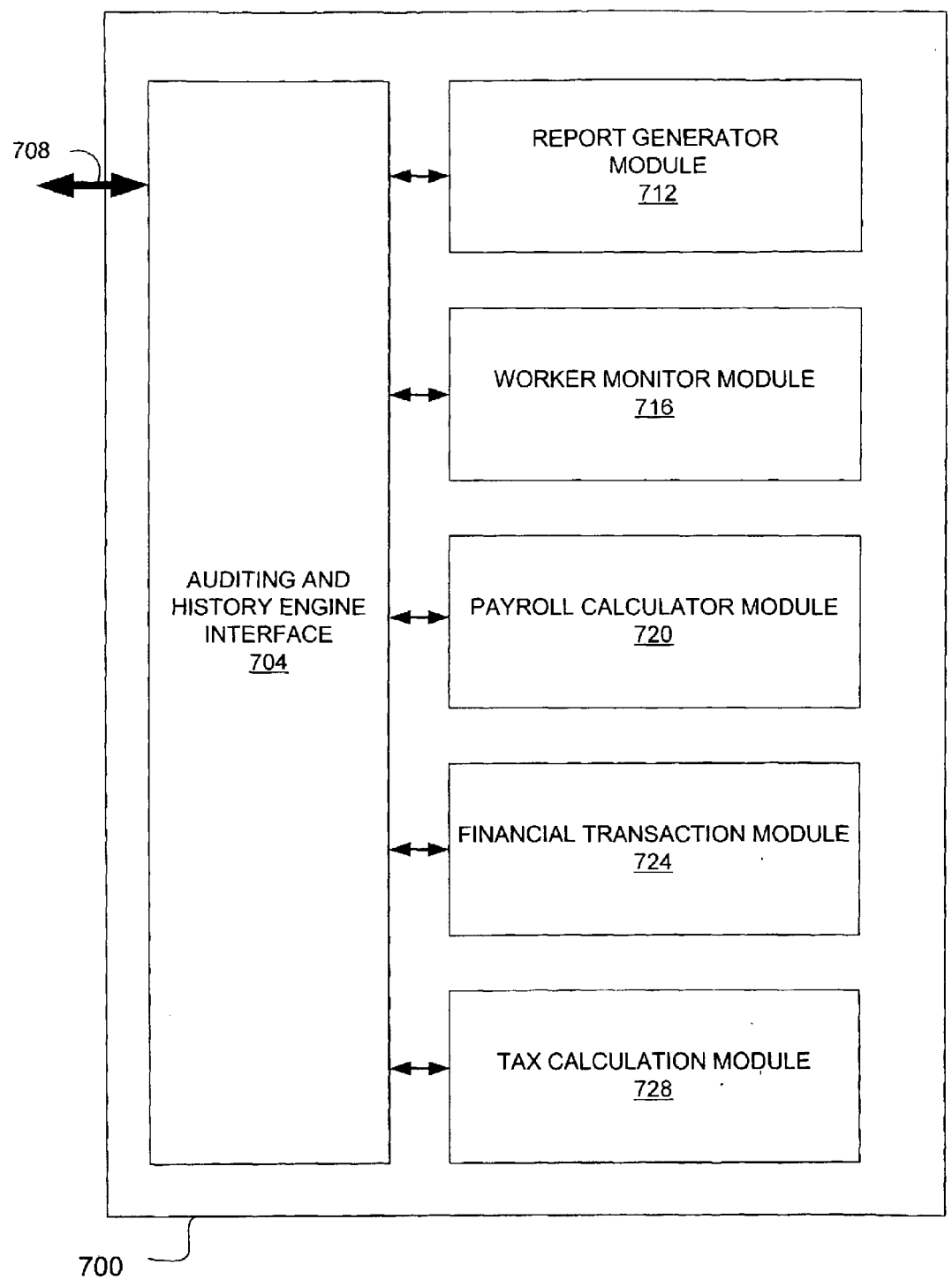
FIG. 7 is a functional block diagram of auditing and history engine.

FIG. 7 is a functional block diagram of auditing and history engine. Auditing and history engine 700 maintains and retains records of access to each file, file creation, modification and deletion. It may also provide any information for authentication such as signatures and watermarks. This aids in the auditing of work card records and the associated work performed.

Figure 8:
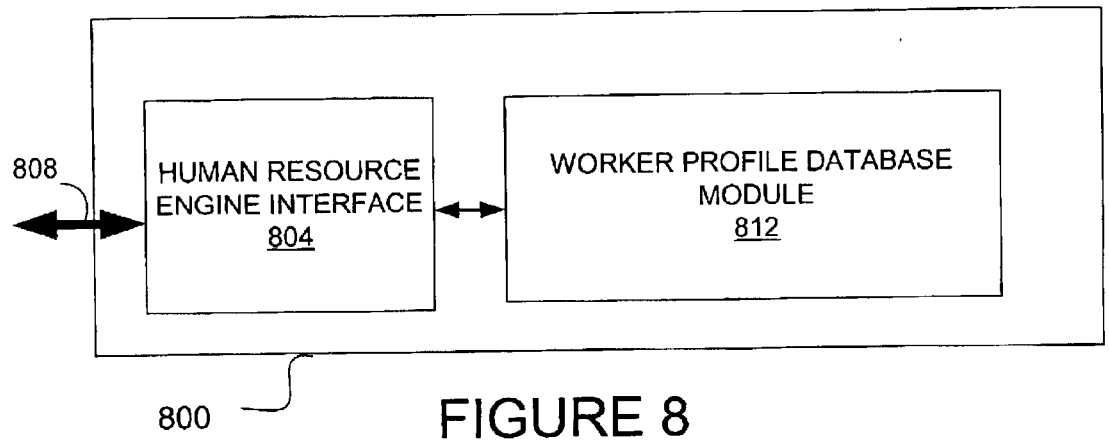
FIG. 8 is a functional block diagram of human resource engine.

FIG. 8 is a functional block diagram of human resource engine. Human resource records associated with a worker may be stored using the human resource engine 800. Data in these records are stored in worker profile database module 812 and may include worker qualifications, worker experience, disabilities that might impart a worker from performing particular tasks, planned vacation days, work records and so on. These records are combined into a worker's personal profile and may be accessed by any of the maintenance system modules of FIG. 1 to allow for optimal planning of future maintenance tasks around human resource constraints. Management may use data from the personal profile to monitor worker productivity and gauge the experience level of a worker for a determined task.

Figure 9:
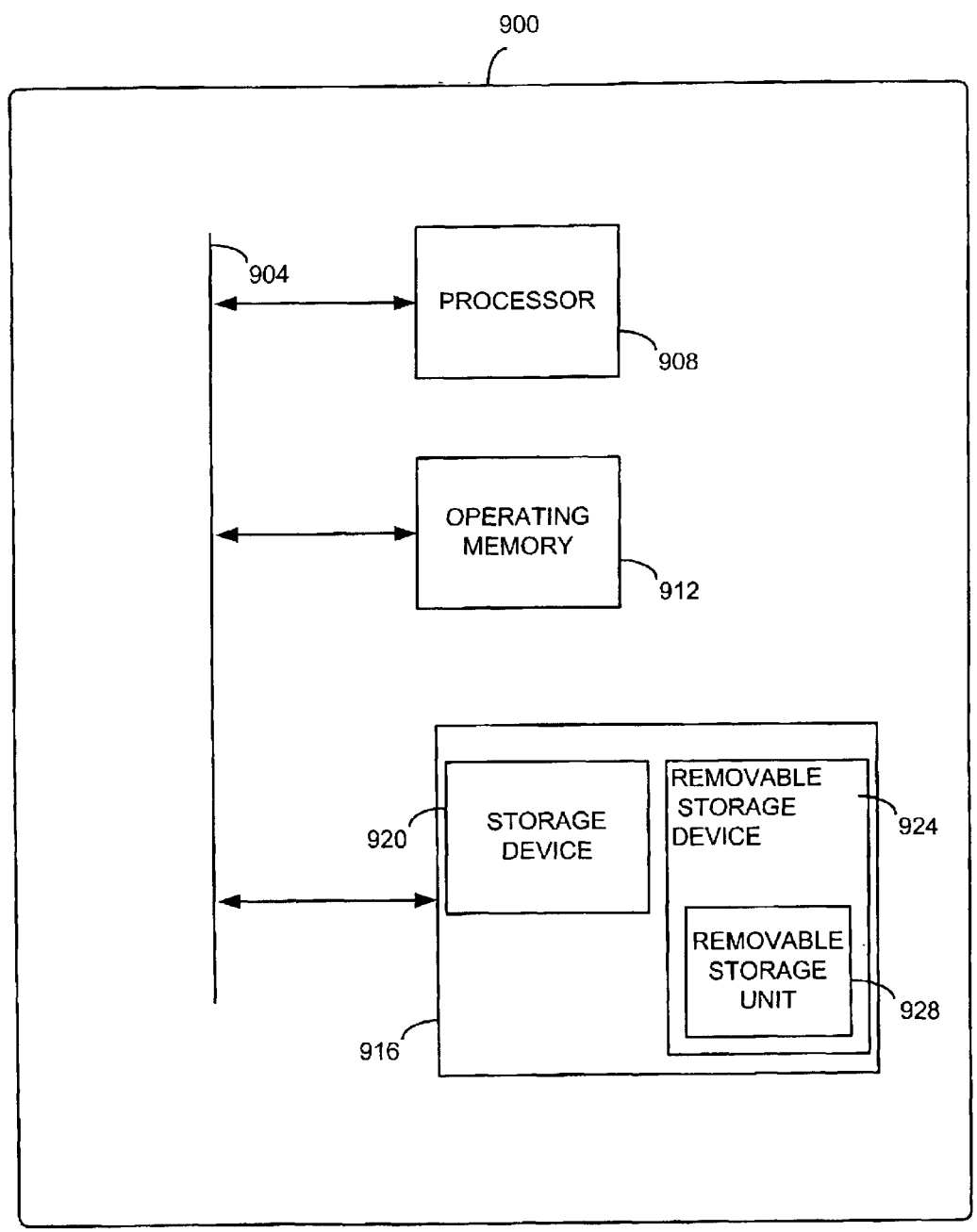
FIG. 9 is a computer system programmed for executing a computer program according to various embodiments of the invention.

FIG. 9 is a computer system 900 programmed for executing a computer program according to various embodiments of the invention. Each engine function may be implemented on a computer system, over a distributed system, or may be combined with one of the aforesaid engine functions. In one embodiment of the invention, a computer system 900 is implemented on a printed circuit board as shown by boards 1308 through 1314 (see FIG. 13), coupled to backplane 1404 so that signals from the board may be communicated across the backplane to communicate with other engine functions and/or boards. In another embodiment, a conventional desktop computer may be modified to include software that implements the described methods.

The computer system 900 has one or more processors, such as processor 908. The processor is communicatively coupled to a bus 904. Bus 904 may be connected or communicatively coupled via a backplane interface to the backplane 1404 of FIG. 14.

The computer system 900 also includes operating memory 912. A suitable operating memory 912 has a random access memory (RAM), and a storage memory 916. The storage memory 916 includes, for example, a storage device 920 and/or a removable storage device 924, representing a floppy disk drive, magnetic tape drive, a compact disc drive, digital versatile disc drive, flash memory drive, etc. The removable storage media 928 is the media used with removable storage device 924. As will be appreciated by those skilled in the art, the storage devices include a computer-useable storage medium having stored therein application software and/or data. Such software and/or data may be loaded from a server onto a storage device.

Computer programs are stored in operating memory 912 and/or in storage device 916. Such computer programs, when executed, enable the computer system 900 to perform the features of the present invention as discussed herein. In particular, the computer programs, when executed, enable the processor 908 to perform the features of the present invention. Accordingly, such computer programs represent controllers of the computer system 900.

In another embodiment, the present invention is directed to a computer program product comprising a computer readable medium having control logic (computer software) stored therein. The control logic, when executed by the processor 908, causes the processor 908 to perform the functions of the invention as described herein.

In yet another embodiment, the present invention is implemented in hardware using, for example, a hardware state machine. Such a hardware state machine circuitry may be implemented, for example, using dedicated logic circuitry, field programmable gate arrays (FPGA), programmable gate arrays (PGA), application specific integrated circuits (ASIC), read only memory (ROM), electrically erasable programmable read only memory (EEPROM), erasable programmable read only memory (EPROM), or any combination or variant thereof. Implementation of the hardware state machine so as to perform the functions described herein will be apparent to persons skilled in the art to which the present invention pertains.

Figure 10:
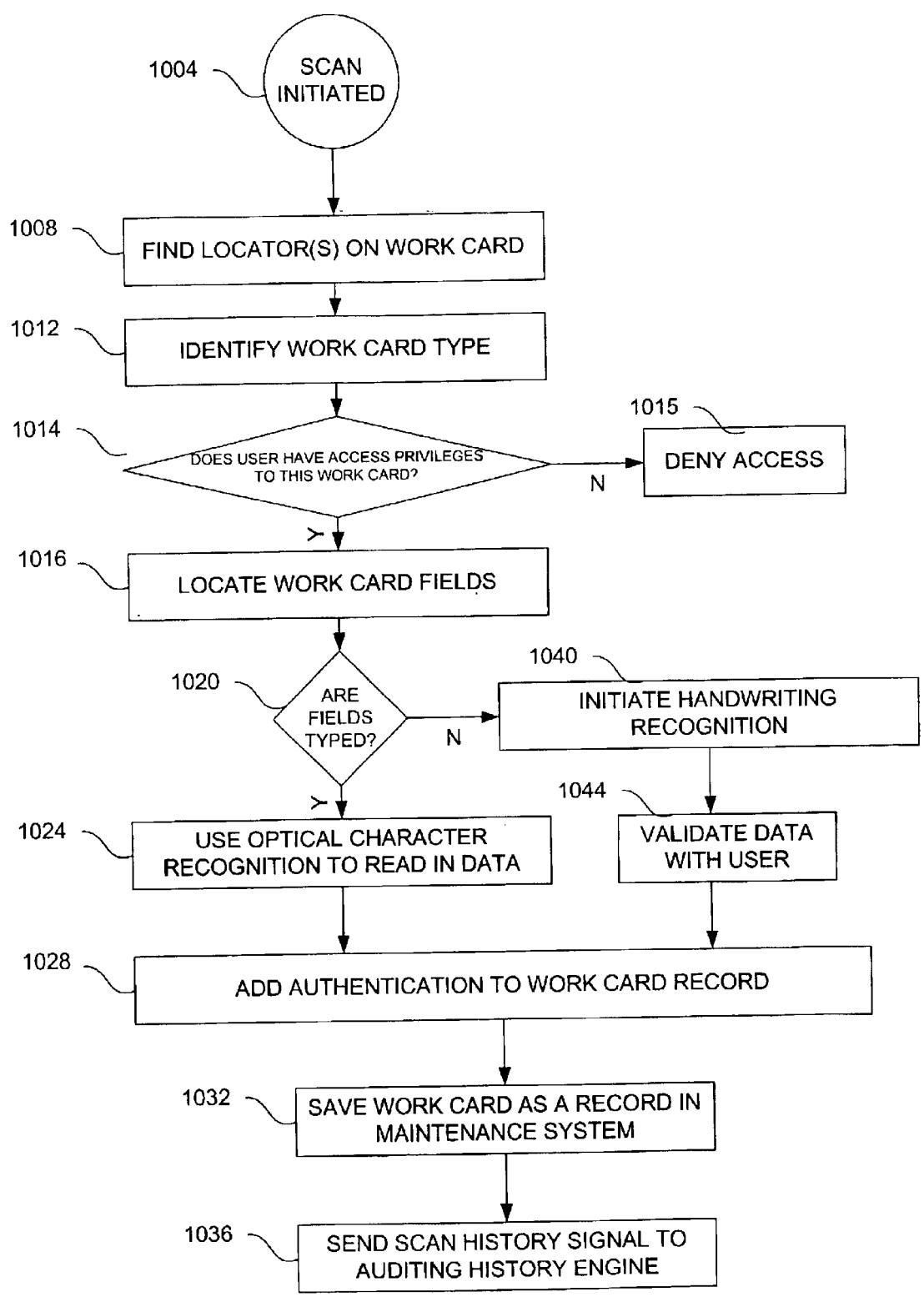
FIG. 10 is a flow diagram for inputting data from a work card record into a maintenance system.

FIG. 10 illustrates a flow diagram for inputting data from a work card record into a maintenance system. The work card is input into the scanner. The scan is initiated (step 1004). The scanner may then seek at least one locator on the work card for positional information (step 1008). The work card type is then identified (step 1012). Next a check is performed to check the user has sufficient access privileges for this work card (step 1014). If the user does not have sufficient access privileges (step 1015) then access is denied. Should the user have sufficient access then the work card fields are located (step 1016).

A determination is then made if fields are typed (step 1020). If a field is not typed but has information in it, then image or handwriting recognition is performed on it (step 1040). The data decoded by the handwriting recognition step may then be validated by the user (step 1044). If the field is typed then optical character recognition is performed to read in the data (step 1024). Authentication may then be added to the work card record (step 1028) prior to the storage/saving of the work card as a record in the maintenance system (step 1032). A scan history signal may then be sent to the auditing and history engine worth information of user actions and record access (step 1036).

Figure 12:
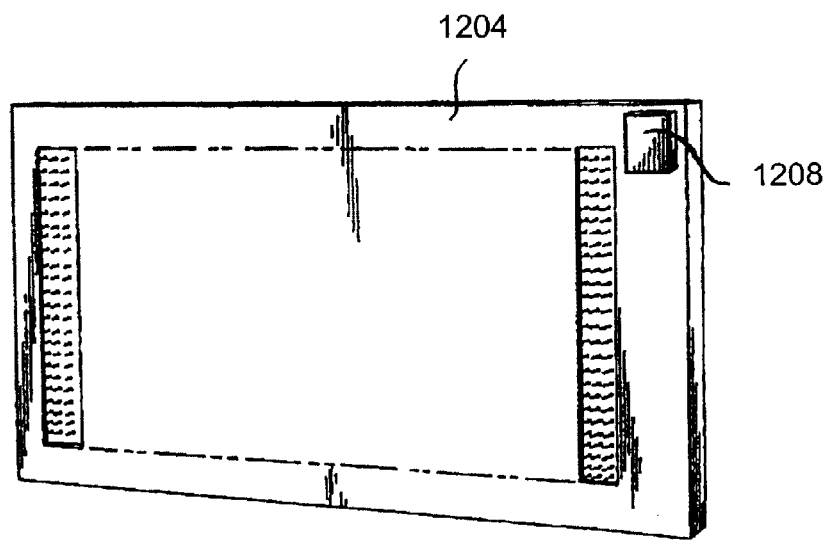
FIG. 12 is a rear view of a board carrier.
Figure 11:
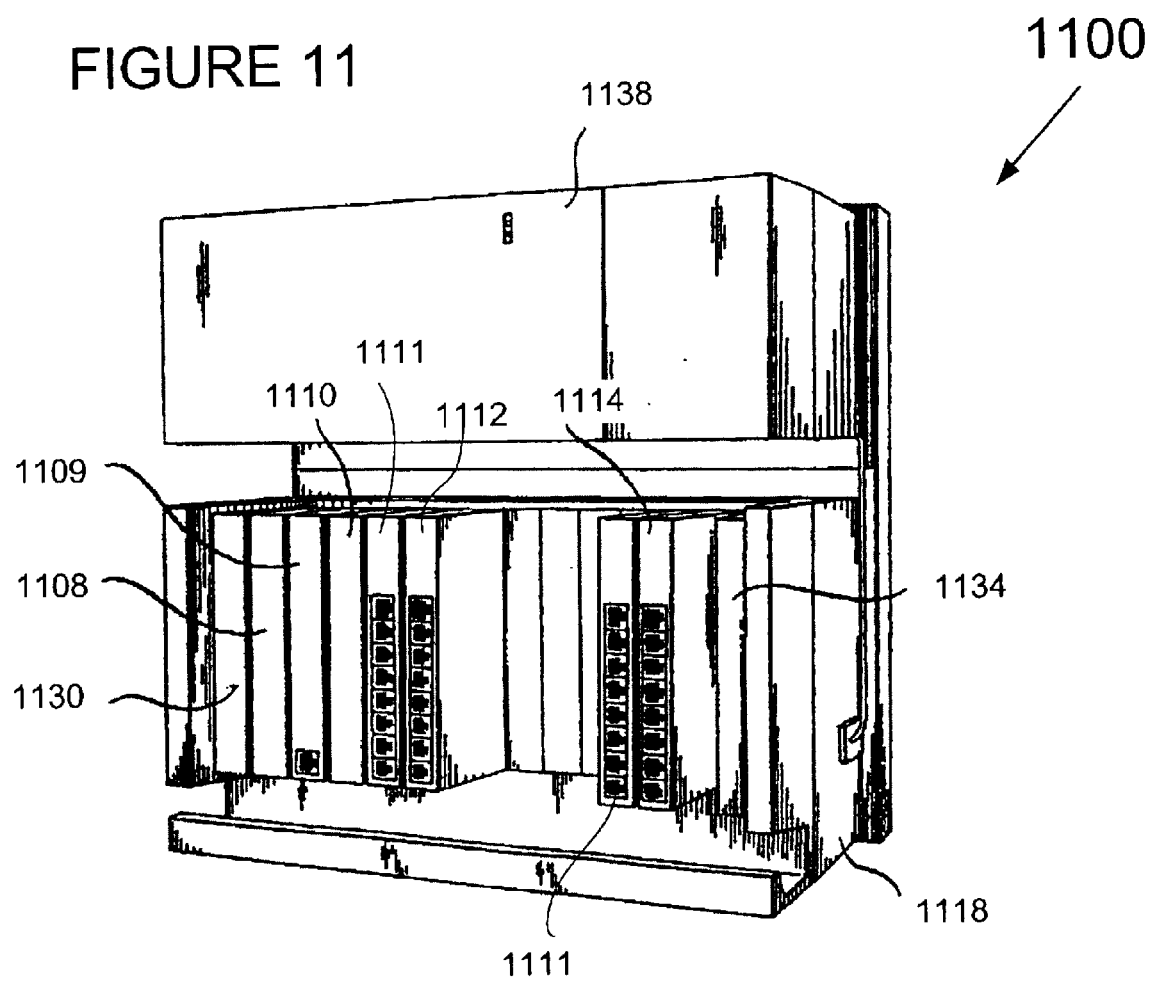
FIG. 11 is a front view of a board carrier.

FIG. 11 is a front view of a rack for holding the maintenance server according to one embodiment of the present invention. As illustrated in FIG. 11, rack 1100 comprises printed circuit boards 1108 through 1114, which are physically mounted in board carrier 1118. These boards plug into backplane 1204, as illustrated in FIG. 12, which is attached to board carrier 1118. The boards illustrated in FIG. 11 have a processor for executing initial diagnostics on the circuits of that board and also for reporting the diagnostics of that board to the remote diagnostics processor 1126, which is physically mounted on remote diagnostics processor board 1130.

In addition, as illustrated in FIG. 12, backplane 1204 has a backplane processor 1208. Backplane processor 1208 responsively provides information denoting the backplane type of backplane 1204, the number of boards plugged into backplane 1204, and the location of each board.

Power board 1134 provides the power to the boards plugged into backplane 1204. Power supply 1138 supplies power to power board 1134. Communications fabric interface board 1112 interfaces the devices coupled to backplane 1204 to a communications fabric. Communications fabric can be a variety of different types of communications technology, i.e., optical technology for broadband communications, wireless technology for wireless communications, etc. to allow operability of the present invention regardless of communications transport medium.

While the invention is susceptible to various modifications and alternative forms, specific embodiments thereof have been shown by way of example in the drawings and detailed description. It should be understood, however, that the drawings and detailed description thereto are not intended to limit the invention to the particular corm disclosed, but on the contrary, the invention is to cover all modifications, equivalents, and alternatives falling within the spirit and scope of the present invention as defined by the claims. For example, Additionally, the logic of the above described invention may be formed in hardware or defined by computer instructions stored in memory and executed by a processor. As may be seen, the described embodiments may be modified in many different ways without departing from the scope or teachings of the invention.

What is claimed is:

1. A maintenance server for monitoring and facilitating aircraft maintenance procedures, comprising:

a memory for storing computer instructions that define the operational logic of the maintenance server;

said operational logic including logic to prompt a maintenance manager to identify a maintenance task that is to be performed and, responsive thereto, generating an electronic package for delivery to the maintenance personnel, said electronic package being transmitted to a portable storage medium, said computer instructions further defining logic to create and arrange data according to a plurality of specified formats;

said memory further comprising computer instructions that define logic that closes specified charge numbers that relate to the specified tasks once an indication is received from a maintenance supervisor that the tasks are completed and approved;

a data bus coupled to the memory; and a processor coupled to the data bus wherein said processor communicates with said memory over said data bus to receive computer instructions therefrom for execution, said processor also receiving data from said memory for transmission to an external device.

2. The server of claim 1, wherein said computer instructions specifically define logic to prompt the processor to create an electronic package that defines the process steps that a maintenance personnel is to perform for an identified aircraft and an identified task.

3. The server of claim 1, wherein the computer instructions further define logic that prompts the server to create the electronic package containing maintenance process steps as well as a maintenance process flow chart both for display or printing by the maintenance personnel.

4. The maintenance server of claim 1, further comprising computer instructions that define logic for maintaining a list of maintenance personnel and supervisors and the repair tasks for which they are authorized to charge and receive the electronic package that is generated by the maintenance server.

5. The maintenance server of claim 1, further comprising computer instructions that define operation of the maintenance server for communicating over a wireless communication interface.

6. The maintenance server of claim 1, further comprising computer instructions that define a corresponding set of test procedures for every defined maintenance task so that maintenance work may properly be tested.

* * * * *